Patented Dec. 15, 1942

2,305,088

UNITED STATES PATENT OFFICE 2,305,088

PIGMENT

Roy H. Kienle, Bound Brook, and William D. Gerdsen, Plainfield, N. J., assignors, by mesne assignments, to American Cyanamid Company, New York, N. Y., a corporation of Maine No Drawing. Application November 22, 1938, Serial No. 241,760

10 Claims. (Cl. 106—289)

This invention relates to improved pigment compositions, and processes of preparing them.

In the past, it has been proposed to extend organic pigments by precepitating or forming the pigment on substrates. Such a procedure involves chemical reaction of the pigment-forming components and usually produces by-products of the reaction. Examples of such processes are where two components of an insoluble azo pigment are caused to react with each other in the presence of a substrate.

It has also been proposed to produce extended organic pigments by precipitating an organic pigment by chemical reaction and, at the same time, chemically precipitating a substrate therewith. For example, a mixture of one component of an azo pigment may be mixed with barium chloride and reacted with a mixture of a sulfate and the other component of the azo pigment, thus producing the pigment and the substrate in the same operation. A small advantage in fineness of division thus obtained is counter-balanced to a greater or less extent by the presence of other products of reaction which are produced in intimate admixture with the pigment and substrate.

An improvement over the two processes outlined above is described in the copending application of Crossley and Kienle, Serial No. 233,483 filed October 5, 1938, according to which organic pigments are physically dissolved in solvents from which they are then precipitated onto insoluble substrates, either colored or uncolored, without substantial chemical change of the pigment. By this process, the organic pigment is transformed from solution into an insoluble form without the production of by-products which might contaminate the final extended pigment. The term "without substantial chemical change" is used to distinguish precipitations from solutions from precipitations where there is a definite new chemical compound formed. It is assumed frequently in physical chemistry that solutions may involve some chemical change and possibly form hydrated compounds while in solution but the chemical bonds thus resulting are relatively loose and are of a different character from those which result when precipitation is effected by a reaction with the material precipitated. Throughout this specification and claims the expression "without substantial chemical change" is used to cover procedures in which no chemical change other than that of ordinary solution and precipitation takes place and it should be understood that the expression is employed in no other sense.

According to the present invention, a water-insoluble organic pigment, such as a vat, phthalocyanine or azo pigment, or a mixture of pigments, is dissolved in a solvent, such as concentrated sulfuric acid, cold chlorsulfonic acid, thionyl chloride, glacial acetic acid, hot monochloracetic acid, etc. A substrate which is partially soluble in the solvent, for example barium sulfate which forms a gel in concentrated sulfuric acid, or totally soluble, such as anthraquinone in sulfuric acid and chlorsulfonic acid, or a mixture of substrates, is added and the resultant dispersion is preferably drowned in water to effect simultaneous precipitation of the color and substrate. The temperature of the various steps outlined above may be controlled by heating or cooling as the particular case requires. In the case of synthetic resin substrates and azo pigments, non-acid solvents are useful.

The pigments obtained by this procedure possess excellent light-fastness, hiding power and tinctorial value and are suitable for a wide variety of uses in the plastic, textile printing, paper, coating composition, ink, and like fields.

The real advantage of the pigment compositions included in the present invention over those of the prior art lies in their greatly improved fineness of particle size and their homogeneity as well as the absence of by-products produced in the initial formation of the pigments. Many excellent organic pigments on the market to-day are too expensive to be commercially successful. This difficulty has been partly overcome in the past by simply admixing the pigments with extenders, but the resulting pigments, although covering more surface per pound and therefore being cheaper, are often materially weaker and possess a low degree of homogeneity. The essential feature of the present invention, i. e., coprecipitating a pigment and a substrate from a solvent in which the substrate is partially or wholly soluble, enables one to prepare an extremely finely divided pigment composition of improved homogeneity which is relatively inexpensive since the amount of surface covered per pound has been increased by the decrease in particle size and increase in effective color surface. Thus, by means of the present invention, it is possible to bring the prices of many organic pigments down to within the inorganic pigment range.

A further advantage of the present invention due to the fineness of division of the pigment particles is apparent when considering the application of the process to transparent pigments. In the past, in the case of transparent pigments, it has been necessary to sacrifice covering power in order to obtain the advantages of finely divided pigment particles since the finer the particle size, the lower the covering power of the pigment. However, the opaque substrate of the present invention decreases this transparency and a finely divided transparent pigment can be produced which possesses the improved properties of the pigment compositions of the present invention, including excellent covering power.

The invention will be described in greater detail in conjunction with the following specific examples. The parts are by weight.

Example 1

100 parts of 6,6'-dichlor-4,4'-dimethyl-2,2'-bis-thionaphthene indigo, which had been ground in a micro pulverizer, are stirred into 1600 parts of 93% sulfuric acid. After 20 minutes, the color is partially dissolved and then 300 parts of barium sulfate are added and stirred into the acid-color mixture. After 25 minutes of stirring with a large high-speed stirrer, there are no lumps evident. The mixture is then poured into 27,200 parts of tap water, the precipitated color is agitated for 10 minutes in the water and then allowed to settle. The color is washed several times by decantation until it is neutral to Congo red test paper. Once the slurry is neutral, it is heated to 95° C., and 5 lbs. of chlorine are bubbled in the slurry over a period of 30 minutes. The color is then washed by decantation until free from chloride ions, after which it is filtered and finally dried in an air drier at 70° C. A bright red pigment results which is suitable for coloring lacquers for coating wood, metal and paper surfaces and textile printing lacquers and resin emulsions.

Example 2

1 part of Vat Blue GCD (C. I. 1113) is dissolved in 45 parts of 95% sulfuric acid. As soon as the color is in solution, 25 parts of barium sulfate are added and the resulting slurry stirred for 20 minutes. This mixture is then added to 1800 parts of tap water with good agitation. A blue pigment is precipitated. The pigment is washed three times by decantation, filtered, and washed with water until neutral to litmus paper. The press-cake is dried in an oven at 100° C., then pulverized. A blue pigment of good tinctorial value and durability, when ground into a synthetic resin enamel, is obtained.

Example 3

2 parts of Vat Yellow GC (C. I. 1095) and 8 parts of copper phthalocyanine are dissolved in 400 parts of 93% sulfuric acid at about 55° C. 30 parts of sublimed anthraquinone are stirred into the acid-color solution until dissolved. The final solution is then poured into 2000 parts of cold water to coprecipitate the colors and the anthraquinone substrate. The precipitate is agitated for 10 minutes, then filtered, and washed free of acid. The acid-free presscake is dried in an oven at 60° C. The product so produced is a soft and easily grindable homogeneous green pigment. This pigment has wide utility and because of its excellent light-fastness, can be used to produce outdoor paints and lacquers.

Example 4

120 parts of Vat Yellow GC (C. I. 1095) are dissolved in 2400 parts of 93% sulfuric acid at about 50° C. After complete solution is obtained, 280 parts of barium sulfate are added and stirred in the sulfuric acid solution of the color for 20 minutes. The acid mixture is then poured into 12,000 parts of water and 8000 parts of ice and agitated for 10 minutes. The slurry is washed by decantation until it is neutral to litmus paper and filtered. The neutral presscake is dried in an air drier at 60° C. A strong yellow pigment is obtained. The pigment is of general utility including coloring plastics, casting resins, and use in printing inks.

Example 5

15 parts of a blue pigment which was made by tetrazotizing dianisidine and coupling on the benzamide of beta hydroxy naphthoic acid was dissolved in 800 parts of 93% sulfuric acid at 0° C. After 1 hour, the color is completely dissolved. 85 parts of barium sulfate are now added to the acid solution of the color. This mixture is stirred for 30 minutes, then poured into 8000 parts of water. The resulting slurry is partially washed by several decantations whence the remainder of the acid is neutralized by the addition of a small quantity of caustic soda solution. The washed slurry is finally filtered, washed free of sodium sulfate, and dried at 60° C. to yield a blue pigment.

Example 6

1 part of a yellow pigment prepared by diazotizing o-nitro-p-chloraniline and coupling with acetoacet-o-chloranilide is dissolved in 42 parts of molten monochloracetic acid. As soon as the color is in solution, 23 parts of anthraquinone are added and the resulting slurry stirred for 20 minutes. This mixture is then added to 1800 parts of tap water with good agitation. The precipitated color is washed free of acid, then filtered and finally dried. A bright, lightfast, homogeneous pigment results which possesses excellent strength and which is easily dispersible in organic coating compositions.

What we claim is:

1. An organic pigment composition prepared by dissolving an organic pigment and a soluble substrate in a solvent and coprecipitating them therefrom, the precipitated substrate having substantially the same chemical composition as before solution by the addition to the solution of an aqueous liquid miscible with the solvent but having no substantial solvent powers on the pigment and substrate.

2. An organic pigment composition prepared according to claim 1 in which the soluble substrate is anthraquinone.

3. An organic pigment composition prepared by dissolving an organic pigment and an acid soluble substrate in concentrated sulfuric acid and coprecipitating them therefrom, the precipitated substrate having substantially the same chemical composition as before solution by the addition to the solution of an aqueous liquid miscible with the solvent but having no substantial solvent powers on the pigment and substrate.

4. An organic pigment composition prepared by dissolving an organic pigment and a partially soluble substrate in a solvent and coprecipitating them therefrom, the precipitated substrate having substantially the same chemical composition as before solution by the addition to the solution of an aqueous liquid miscible with the solvent but having no substantial solvent powers on the pigment and substrate.

5. An organic pigment composition prepared by dissolving an organic pigment and a partially acid soluble substrate in concentrated sulfuric acid and coprecipitating them therefrom, the precipitated substrate having substantially the same chemical composition as before solution by the addition to the solution of an aqueous liquid miscible with the solvent but having no substantial solvent powers on the pigment and substrate.

6. An organic pigment composition prepared according to claim 5 in which the partially acid soluble substrate is barium sulfate.

7. A method of preparing an organic pigment composition which comprises dissolving an organic pigment and a soluble substrate in a solvent and coprecipitating them therefrom, the precipitated substrate having substantially the same chemical composition as before solution by the addition to the solution of an aqueous liquid miscible with the solvent but having no substantial solvent powers on the pigment and substrate.

8. A method of preparing an organic pigment composition which comprises dissolving an organic pigment and an acid soluble substrate in concentrated acid and coprecipitating them therefrom, the precipitated substrate having substantially the same chemical composition as before solution by the addition to the solution of an aqueous liquid miscible with the solvent but having no substantial solvent powers on the pigment and substrate.

9. A method of preparing an organic pigment composition which comprises dissolving an organic pigment and a partially acid soluble substrate in concentrated acid and coprecipitating them therefrom, the precipitated substrate having substantially the same chemical composition as before solution by the addition to the solution of an aqueous liquid miscible with the solvent but having no substantial solvent powers on the pigment and substrate.

10. A method of preparing an organic pigment composition which comprises dissolving an organic pigment and a partially acid soluble substrate in concentrated sulfuric acid and coprecipitating them therefrom, the precipated substance having substantially the same chemical composition as before solution by the addition to the solution of an aqueous liquid miscible with the solvent but having no substantial solvent powers on the pigment and substrate.

ROY H. KIENLE.
WILLIAM D. GERDSEN.